April 23, 1935.  A. Z. MAMPLE  1,998,766
APPLYING VALVE CONNECTIONS TO LEAD SHEATHS
Filed Dec. 23, 1930
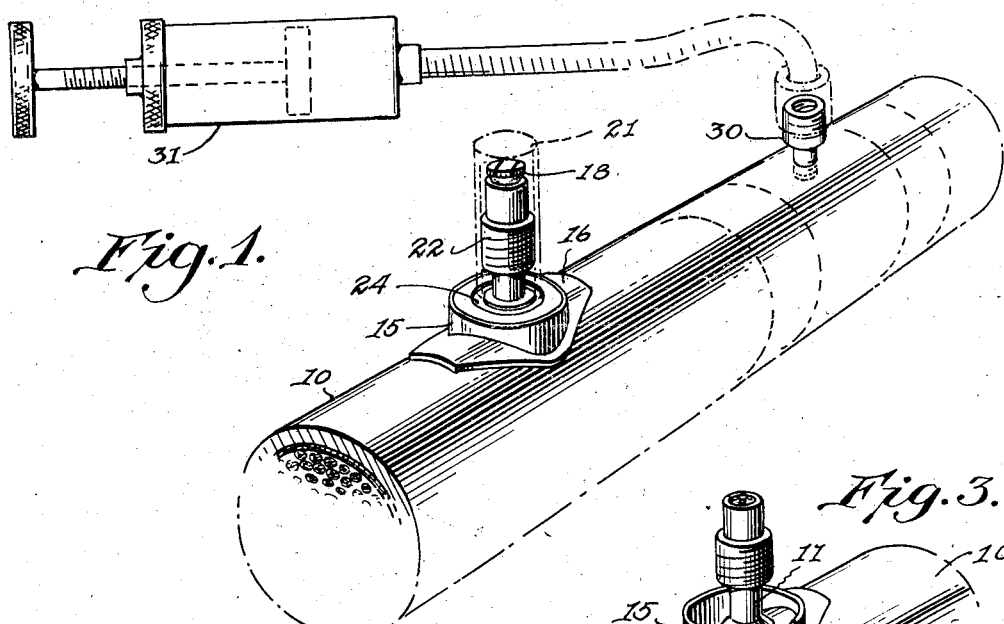
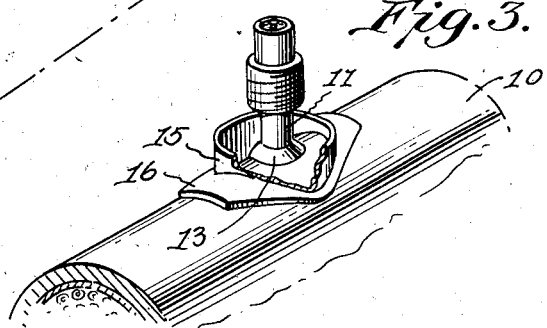
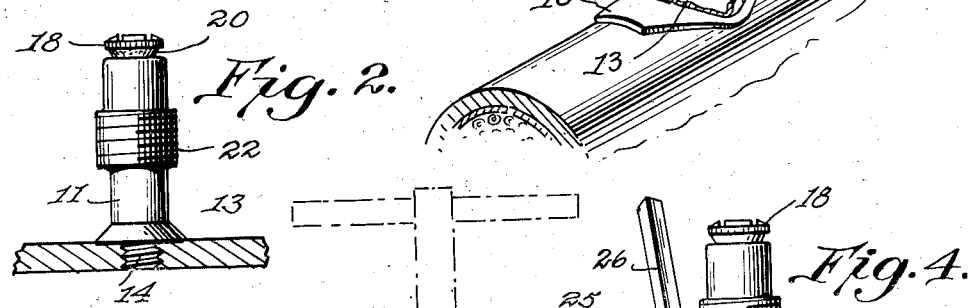
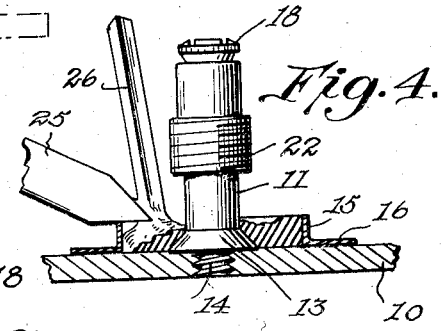
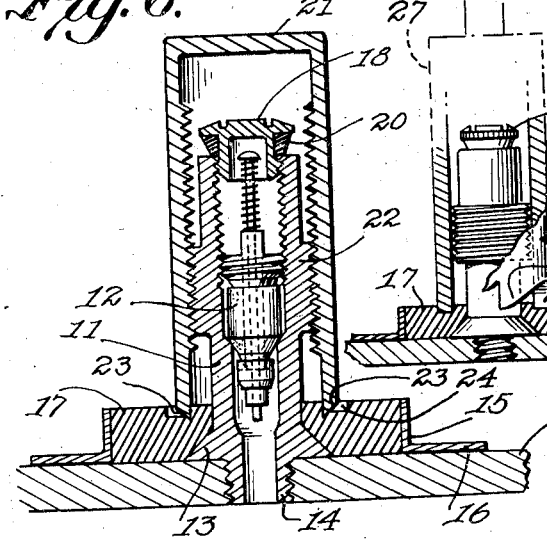
Inventor
A. Z. Mample
Eugene C. Brown
Attorney Patented Apr. 23, 1935

1,998,766

UNITED STATES PATENT OFFICE 1,998,766

APPLYING VALVE CONNECTIONS TO LEAD SHEATHS

Adolph Z. Mample, Glen Rock, N. J., assignor to The Western Union Telegraph Company, New York, N. Y., a corporation of New York Application December 23, 1930, Serial No. 504,373

3 Claims. (Cl. 285—106)

This invention relates to the testing of lead sheathed electrical cables for leaks of air and moisture and has special reference to a testing valve for such cables and method of applying the same thereto.

In the use of cables enclosing electrical conductors and having lead sheaths it is of importance that such lead sheaths be entirely free from flaws such as cracks, pin holes and the like so that no moisture or injurious gas may find its way into the interior of the cable and cause injury to the insulation of the conductors. To this end such cables are tested for leaks and one convenient method of so testing such cables is to produce a gas pressure within the cable for a limited length thereof and observe, by means of a suitable gage or gages the extent and location of the drop in pressure, if any, which takes place after the cable is charged with a gas under pressure and closed except for its communication with the gages. In order to do this a series of valves or nipples of the type used in connection with the inflation of the inner tubes of automobile tires are tapped into the cable at rather closely spaced intervals along the section to be tested, such section being dammed off by some such means as is shown in my prior Patent No. 1,769,524 and in the patent to L. A. Reed No. 1,774,292 if desired. One of these valves is connected to a suitable source of gas under pressure. Gages are connected to the other valves or nipples which are open to allow gas from the cable to flow freely to the gages. After the desired pressure has been established within the cable the valve to which the pressure source is connected is allowed to close. The gages are now observed and, if a leak exists, a drop in pressure will be shown and such drop will be most pronounced at the gage or gages closest to the leak so that the leak may be located and the leaky conditions corrected.

In order to properly connect the valves or nipples to the cable it is essential that no leakage exist at the connection and it has been customary to tap the threaded connecting end of the valve or nipple into the sheath and then to solder around the base or connecting end to prevent leakage at the screw threaded joint. This leaves the valve or nipple held to the cable by its threaded end and by the solder which is difficult to build up to any strength and so as to make an air-tight seal. Under these conditions a blow of no great force against the valve or nipple will serve to break the joint so that leakage will take place or even so that the valve or nipple is entirely broken away from the cable. Moreover, attempts to apply solder in the usual manner at the threaded joint very frequently result in overheating the lead sheath by contact with the hot soldering iron with the consequence that bending of the cable, which frequently occurs in aerial cables due to normal expansion and contraction of the metal sheath and which often becomes necessary in manholes and in other places, causes the development of flaws at the overheated points thus causing leaks where no leaks previously existed. Again, an ordinary valve such as is used for inner tubes is itself frequently subject to leakage and even the common caps screwed on such valves do not always prevent such leakage. In testing cables it is very essential that no leakage of or at the valve shall take place since this would destroy or confuse the gage readings and result in the electrical break down of the circuits carried in the cable at periods when the cable was not under pressure.

The principal objects of the present invention are, therefore, to provide an improved means of securing valves and nipples to lead sheathed cables so that the connection between the parts will be made in such manner as to entirely eliminate leakage; to provide a connection which will stiffen and strengthen the joint and prevent damage to the soft lead sheath and to the circuits carried in the cable which would result from blows against the valve or nipple; to enable solder to be applied without damaging the lead sheathing by overheating; to provide means for effectually sealing such a valve or nipple against leakage therethrough; and to provide an improved method of making the connection and sealing the parts.

With the above and other objects in view the invention will now be described in detail and specifically claimed, reference being had to the accompanying drawing, wherein:

Figure 1 is a perspective view of a portion of a cable showing a valve applied thereto with the cap shown in broken lines.

Figure 2 is a longitudinal section of a portion of a cable sheath showing a valve screwed therein.

Figure 3 is a view similar to Figure 1 with the joint partly completed, a portion of the mold used herewith being shown broken away to disclose the base portion of the valve.

Figure 4 is a view similar to Figure 2 but showing the step of applying the solder.

Figure 5 is a view similar to Figure 4 but showing the routing tool and method of using the same.

Figure 6 is an enlarged view similar to Figure 5 but showing the device completely assembled with the sealing cap in position.

In the embodiment of the invention as here shown there is disclosed an ordinary lead sheathed cable having a lead sheath 10. The valve casing 11 is of the usual cylindrical form and is internally threaded so that an inwardly opening check valve 12 may be fitted therein. A bevelled flange 13 is formed on the casing 11 and a threaded or tapered terminal 14 is axially alined with the body of the casing below the flange 13. When assembled on the sheath 10, the terminal 14 is screwed into an opening formed in the sheath to fit tightly therein, this opening being drilled through the sheath but care being taken to stop the drilling operation before the paper or other outer insulating layer is pierced. The preferable method of drilling the holes through the lead sheath is disclosed in the joint application of this applicant and E. J. Hobart, Serial No. 501,634, filed December 11, 1930. Also, when completely assembled an open topped annular mold 15 having an outwardly extending basal flange 16 surrounds the flange 13 and the portion of the valve casing 11 immediately thereabove, the flange 16 being transversely curved to fit the sheathing 10. Solder 17 fills the mold 15 and overlies the flange 13, adhering firmly thereto and to the casing 11 as well as to the sheath 10. The solder 17 also runs under the flange 16 to solder the latter firmly to the sheath. The valve casing is thus provided with a strong and rigid base adhesively united throughout its entire area with the lead sheath 10, this base forming a relatively heavy flange on the casing. A cap or plug 18 is screwed into the internally threaded upper end of the casing 11 and is provided with a gasket 20, of rubber or other suitable packing material, which fits tightly against the casing and forms an air tight joint at this place. A cap 21 is also provided which is threaded interiorly, the threads projecting inwardly from the cylindrical body portion at each end to engage the enlarged central portion 22 of the casing 11. The central portion 22 has a maximum diameter equal to the internal diameter of the cap at its open end so that the open end will slide over the threaded portion 22. A bevelled cutting edge 23 is formed at the open end, the edge being at the inner surface of the open end. An annular groove 24 is formed in the upper surface of the solder 17 concentric to the casing 11 and has a minor diameter equal to the internal diameter of the open end of the cap 21 so that application of the cap by screwing it firmly down on the threaded portion results in the edge portion of the cap fitting against the inner wall of the groove 24, while the cutting edge 23 will bite into the bottom of the groove. By this means, not only does the valve 12 act to prevent out flow of gas from the cable sheath but the action of the valve 12 is supplemented by the plug 18 and the cap 21 so that there are three places at which communication is closed between the interior of the cable and the outside atmosphere. Under these conditions escape of gas from the cable through the valve casing when the cable is under pressure or admission of moisture into the cable through the valve casing when the cable is not under pressure is positively prevented.

In order to thus assemble the parts in the relation described the casing 11 is first screwed or fitted into position in the prepared opening as above set forth. Then the mold 15 is set in position around the base of the casing 11 on the cable sheath. Suitable means are employed to hold the mold in position, for instance, a wire may be wrapped around the cable over the end portions of the flange 16. A hot soldering iron 25 is then placed in position as indicated in Figure 4, and a bar or rod 26 of suitable solder is brought into contact with the soldering iron until sufficient solder is melted to fill the mold up to its top, the solder being smoothed off by the iron to lie flush with the mold edge. In the act of melting the solder, a certain portion of the solder will flow between the flange 16 and the sheath 10. When the solder cools and solidifies the mold will be fixed solidly to the sheath 10 and the solder will form a rigid heavy flange at the bottom of the casing 11 of harder metal than the sheath. A cylindrical routing tool 27 having an internal diameter such that it will fit snugly over the threaded portion 22 is now applied as in Figure 5 and rotated, causing its teeth 27a to cut the groove 24 which is thus cut to the proper size to accommodate the cutting edge portion of the cap 21. As the bore of the tool fits snugly about the perimeter of the threads 22, the tool is accurately centered and aligned with respect to the axis of the valve casing, thereby causing the plane of the groove to be perpendicular to the axis. Thus the method employed in substance consists in tapping or tightly fitting a valve casing into the tapped cable sheath, applying a mold around the tapped end of the casing, filling the mold with solder, allowing the solder to harden, then applying a cap over the casing, and forcing the edge of the cap into the solder. It is to be noted that, while the groove 24 is preferably employed to improve the fit of the cap against the solder, the groove 24 may be omitted in some instances.

It is to be noted that wherever the casing 11 is referred to as a "valve casing" it is to be understood also to refer to a pipe nipple such as may be used without valve fittings having a threaded or tapered end at the bottom similar to the valve casing but with a threaded portion at the top to which a pressure gun may be connected to the cable for the purpose of introducing mineral wax and a semi-liquid material to form a dam in the manner disclosed in Patent No. 1,769,524. I have shown such a nipple connection at 30 and have indicated a grease gun 31 attached thereto.

I claim:

1. In combination, a cable having a lead sheath, a valve casing extending from the sheath and communicating with the interior of the casing, a metallic mold surrounding the portion of the casing adjacent the sheath, a mass of solder filling the space between the mold wall and the casing and adhering to the casing and to the sheath, and a cap having its open end bevelled to provide a cutting edge, the cap fitting over the casing and having its cutting edge engaged in the solder within the mold to form a gas-tight joint.

2. In combination, a valve fitting having one end engaging a hole in the sheath of a cable, a ferrule surrounding said fitting and spaced therefrom, a filling of fusible material between said ferrule and fitting, and a cap threadedly engaging said valve fitting and having sharpened edges adapted to cut into said fusible material for forming a seal.

3. In combination, a cable having a lead sheath, a valve fitting having one end engaging a hole in the sheath, means to reinforce said fitting against lateral thrusts comprising a circular ferrule surrounding said fitting and equally spaced therefrom, a filling of fusible material integrally uniting said fitting, sheath and ferrule, said filling being provided with an annular groove, and a cap enveloping said fitting and having its edge extending into said groove.

ADOLPH Z. MAMPLE.